(12) United States Patent
Jorge et al.

(10) Patent No.: US 9,932,681 B2
(45) Date of Patent: Apr. 3, 2018

(54) ELECTROLYTIC CELL

(71) Applicant: Saint-Gobain Centre De Recherches Et D'Etudes European, Courbevoie (FR)

(72) Inventors: Eric Jorge, Les Valayans (FR); Olivier Francy, L'isle sur la Sorgue (FR); Olivier Panagiotis, Cavaillon (FR)

(73) Assignee: Saint-Gobain Centre De Recherches Et D'Etudes Europeen, Courbevoie (FR)

( * ) Notice: Subject to any disclaimer, the term of this patent is extended or adjusted under 35 U.S.C. 154(b) by 229 days.

(21) Appl. No.: 14/373,170

(22) PCT Filed: Jan. 18, 2013

(86) PCT No.: PCT/IB2013/050492
§ 371 (c)(1),
(2) Date: Jul. 18, 2014

(87) PCT Pub. No.: WO2013/108233
PCT Pub. Date: Jul. 25, 2013

(65) Prior Publication Data
US 2015/0299880 A1    Oct. 22, 2015

(30) Foreign Application Priority Data
Jan. 20, 2012  (FR) ...................... 12 50595

(51) Int. Cl.
*C25C 1/00*    (2006.01)
*C25C 3/00*    (2006.01)
(Continued)

(52) U.S. Cl.
CPC .............. *C25C 7/00* (2013.01); *C04B 35/107* (2013.01); *C04B 35/1015* (2013.01);
(Continued)

(58) Field of Classification Search
CPC .... C25C 1/00; C25C 7/02; C25C 3/00; C25C 7/00; C25C 3/06; C25C 3/08; C25C 5/00; C25C 7/025; Y02P 10/234
(Continued)

(56) References Cited

U.S. PATENT DOCUMENTS 2,034,339 A    3/1936  Gadeau
3,386,908 A    6/1968  Daurat
(Continued)

FOREIGN PATENT DOCUMENTS

EP    0 132 031    1/1985
EP    0 150 007    7/1985
(Continued)

OTHER PUBLICATIONS

French Search Report and Written Opinion for corresponding French Application No. FR 12 505959, dated Jan. 20, 2012.
(Continued)

*Primary Examiner* — Zulmariam Mendez
(74) *Attorney, Agent, or Firm* — Jones Robb, PLLC (57) ABSTRACT

The present disclosure relates to an electrolytic cell for the production of aluminium by reducing alumina. The cell may comprise a sidewall including at least one side block. The side block may comprise an aluminous material having an apparent porosity of less than about 10% and a composition, as a weight percentage on the basis of the aluminous material and for a total of about 100%, such that: $Al_2O_3$>about 50%, beta-alumina being less than about 20% of the weight of the aluminous material, oxides that are less reducible than alumina at 1000° C.<about 50%, $Na_2O$<about 3.9%, and other components<about 5%.

51 Claims, 1 Drawing Sheet

(51) Int. Cl.

| | |
|---|---|
| *C25C 7/00* | (2006.01) |
| *C25C 3/06* | (2006.01) |
| *C25C 3/08* | (2006.01) |
| *C25C 5/00* | (2006.01) |
| *C04B 35/101* | (2006.01) |
| *C04B 35/107* | (2006.01) |
| *C25C 3/18* | (2006.01) |
| *C04B 35/626* | (2006.01) |
| *C04B 35/634* | (2006.01) |
| *C25C 3/24* | (2006.01) |
| *C25C 1/02* | (2006.01) |

(52) U.S. Cl.
CPC .. *C04B 35/62665* (2013.01); *C04B 35/63488* (2013.01); *C25C 1/02* (2013.01); *C25C 3/085* (2013.01); *C25C 3/18* (2013.01); *C25C 3/24* (2013.01); *C04B 2235/3201* (2013.01); *C04B 2235/3203* (2013.01); *C04B 2235/3206* (2013.01); *C04B 2235/3208* (2013.01); *C04B 2235/3217* (2013.01); *C04B 2235/3222* (2013.01); *C04B 2235/3229* (2013.01); *C04B 2235/3232* (2013.01); *C04B 2235/3236* (2013.01); *C04B 2235/3241* (2013.01); *C04B 2235/3244* (2013.01); *C04B 2235/3272* (2013.01); *C04B 2235/3281* (2013.01); *C04B 2235/3284* (2013.01); *C04B 2235/3293* (2013.01); *C04B 2235/3409* (2013.01); *C04B 2235/3418* (2013.01); *C04B 2235/3427* (2013.01); *C04B 2235/3821* (2013.01); *C04B 2235/442* (2013.01); *C04B 2235/445* (2013.01); *C04B 2235/5427* (2013.01); *C04B 2235/5436* (2013.01); *C04B 2235/5445* (2013.01); *C04B 2235/5472* (2013.01); *C04B 2235/662* (2013.01); *C04B 2235/72* (2013.01); *C04B 2235/727* (2013.01); *C04B 2235/77* (2013.01); *C04B 2235/80* (2013.01); *C04B 2235/95* (2013.01); *C04B 2235/9607* (2013.01); *C04B 2235/9692* (2013.01)

(58) Field of Classification Search
USPC .......................................................... 205/560
See application file for complete search history.

(56) References Cited

U.S. PATENT DOCUMENTS

| | | | |
|---|---|---|---|
| 3,607,685 | A | 9/1971 | Johnson |
| 4,552,637 | A | 11/1985 | Vire et al. |
| 4,647,357 | A | 3/1987 | Dewing |
| 4,737,254 | A | 4/1988 | Gesing et al. |
| 5,322,826 | A | 6/1994 | Becker et al. |
| 5,560,809 | A | 10/1996 | Cortellini |
| 6,258,247 | B1 | 7/2001 | Brown et al. |
| 2010/0179051 | A1 | 7/2010 | Citti et al. |

FOREIGN PATENT DOCUMENTS

| | | |
|---|---|---|
| EP | 0 552 402 | 7/1993 |
| FR | 759.588 | 2/1934 |
| FR | 1208577 | 2/1960 |
| FR | 75893 | 8/1961 |
| FR | 82310 | 1/1964 |
| FR | 2 918 659 | 1/2009 |
| GB | 1 007 864 | 10/1965 |
| GB | 1036893 | 7/1966 |
| JP | 5-93291 | 4/1993 |

OTHER PUBLICATIONS

International Search Report for PCT/IBN2013/050492 dated Jul. 18, 2013.

Zhao, et al., "The Development of 85KA Three-Layer Electrolysis Cell for Refining of Aluminum", Light Metals, TMS (the Minerals, Metals & Materials Society), pp. 533-535, 2008.

Danielik, "Phase Equilibria in the System KF-AlF3-Al2O3", Chem. Pap. 53(2), pp. 81-84, 2005.

"Sets fondus à haute température" [High temperature molten salts] by Véronique Ghetta, Jacques Fouletier and Pierre Taxil, published by Presses polytechniques et universitaires romandes, chapter 8, pp. 189-208.

"Traité de céramiques et matériaux minéraux," [Treatise on ceramics and mineral materials], C.A. Jouenne, Editions Septima, Paris (1984), pp. 403 to 405.

ELECTROLYTIC CELL

This is a national stage application of PCT/IB2013/050492, filed internationally on Jan. 18, 2013, which claims priority to French Application No. FR 1250595, filed Jan. 20, 2012, the entire disclosures of each of which are incorporated herein by reference.

TECHNICAL FIELD

The present disclosure relates to a refractory block, in particular for the construction of an aluminum electrolytic cell, and a cell comprising such a block.

INTRODUCTION

Figure 1:
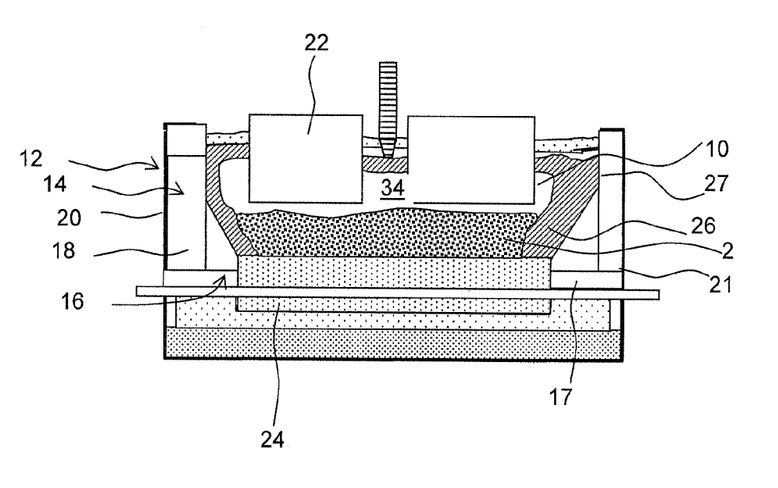

As represented in FIG. 1, aluminum metal 2 may be produced industrially by electrolysis of alumina in solution in a bath 10 based on molten cryolite. The electrolyte bath 10 is conventionally contained in an electrolytic cell 12. The cell 12 comprises a side wall 14 and a base 16. The base 16 is composed of refractory base blocks 17 and of cathode blocks 24 and, in the bottom part, of insulating blocks. The side wall 14 is formed by means of side refractory blocks 18, surrounded by a metal shell 20 or casing.

The dimensions of a side refractory block 18 vary. They are conventionally greater than 75×300×300 mm³ and may reach 120×600×1500 mm³.

The side blocks 18 are typically joined with a refractory cement 21 placed between them and against the metal shell 20. The cell 12 comprises at least one anode 22 and at least one cathode 24. The anodes 22 and cathodes 24 are placed so as to be in contact with the bath of molten metal, the cathode 24 being conventionally placed near the base 16.

Under the effect of powering up the electrodes 22 and 24, an electrolysis reaction takes place in the bath 10. This results in the formation of a bath of aluminum in the cell that is deposited on the cathode.

The passage of the high intensity electric current through the bath 10 also generates heat via the Joule effect. The evacuation of this heat through the wall 14 of the cell 12 leads to the deposition of a layer 26 of solidified cryolite on the inner surface 27 of the side blocks 18. This layer is referred to as a "self-lining" layer.

The side blocks 18 must ensure the protection of the metal shell 20. They are often exposed to corrosive environments (liquid metal at very high temperature, molten cryolite in the lower part, corrosive gases in the upper part) and subjected to high temperatures and large thermal and mechanical stresses.

Furthermore, the side blocks 18 are conventionally designed to enable sufficient evacuation of the heat in order to ensure the temperature stabilization of the molten bath 10. In particular, it is necessary to avoid reaching temperatures beyond which the self-lining layer 26 of solidified cryolite would become liquid again and would contribute to a very rapid corrosion of the cell sides.

U.S. Pat. Nos. 3,607,685, 4,647,357 and 4,737,254 describe alumina-based side blocks. These documents do not specify the amount of $Na_2O$ contained in the alumina sources used, nor the open porosity of these blocks.

In order to limit the energy consumption, side blocks in the form of ceramic plates that are thermally insulated on the rear face and are capable of withstanding corrosion by the electrolyte bath have been described, for example in U.S. Pat. No. 5,560,809. The feasibility of large plates on an industrial scale at an acceptable cost and the control of the joints between these plates based on silicon carbide, silicon nitride and boron carbide, have however limited their commercial development.

There is a need for novel solutions in order to limit the energy consumption during the production of aluminum by electrolysis.

One objective of the various exemplary embodiments described herein is to at least partially meet this need.

SUMMARY

This objective may be achieved by means of an electrolytic cell for the production of aluminum by reduction of alumina, said cell containing an electrolyte bath, in particular a cryolite bath, and having a side wall that comprises at least one side block, said side block, comprising an aluminous material having an open porosity of less than 10%, and
a composition, as a weight percentage on the basis of the aluminous material and for a total of 100%, such that:
$Al_2O_3$>50%,
oxides that are less reducible than alumina at 1000° C.:<46%,
$Na_2O$<3.9%,
other constituents<5%.

The oxides that are less reducible than alumina at 1000° C., $Na_2O$, and the "other constituents" are each optional, but overall they make it possible to define the balance to 100% of the alumina.

Surprisingly, the inventors have discovered that by selecting an aluminous material that guarantees a low $Na_2O$ content, the side block is perfectly well suited to aluminum electrolytic cells, in particular when it is in contact with the electrolyte bath. The self-lining layer is therefore no longer essential and the side wall of the cell may be thermally insulated.

This discovery is all the more surprising since the alumina content of the aluminous material is high and since the cryolite bath is designed to dissolve alumina.

Surprisingly, the inventors have also discovered that the aluminous material according to the various exemplary embodiments described herein withstands a very acidic electrolyte bath well, which makes it possible to operate the cell at a reduced temperature.

A cell according to an exemplary embodiment may moreover in particular have one or more of the following optional characteristics:

The electrolyte bath comprises $AlF_3$ and at least one alkali metal fluoride NaF or KF such that the (NaF+KF)/$AlF_3$ molar ratio is less than about 3, or more preferably less than about 2, or more preferably less than about 1.6. The bath may comprise other fluorides such as LiF; $MgF_2$; $CaF_2$.

The electrolyte bath comprises a molar content of $AlF_3$ of greater than about 30%.

The electrolyte bath comprises a molar content of $AlF_3$ of greater than about 37%.

The side block has a minimum thickness of greater than about 40 mm and/or a total porosity of less than about 10%.

The composition of the aluminous material is such that:
$Al_2O_3$+MgO+CaO>about 70%, or $Al_2O_3$+MgO+CaO>about 95%, and/or
$Al_2O_3$>about 92%, and/or
$Na_2O$<about 1%, or even $Na_2O$<about 0.1%, and/or
oxides that are less reducible than alumina at about 1000° C.:<about 10%, or <about 5%.

The aluminous material comprises at least a corundum and/or magnesium spinel crystalline phase and/or a hibonite ($CaO \cdot 6Al_2O_3$) phase.

The aluminous material has a beta-alumina content of less than about 20%, preferably less than about 15% by weight of the aluminous material.

The thermal conductivity of the aluminous material at about 600° C. is less than about 10 W/m·K.

The electrical resistivity of the aluminous material at about 700° C. is greater than about 2000 ohm.cm.

The length and/or the width and/or the thickness, preferably all the overall dimensions of the side block are greater than about 5 cm, preferably greater than about 10 cm, preferably greater than about 15 cm. The width is preferably greater than about 20 cm, or greater than about 30 cm, or greater than about 50 cm. The length is preferably greater than about 30 cm, or greater than about 50 cm or else greater than about 60 cm or even greater than about 80 cm.

The various exemplary embodiments described herein further contemplate a process for producing aluminum by passing an electric current into an electrolyte bath by means of a cell, according to the various exemplary embodiments described herein.

Preferably, under steady-state operation, that is to say after the start-up step,
   the aluminous material is in contact with the electrolyte bath, that is to say that the cell does not comprise a self-lining layer, and/or
   the electrolyte bath is at a temperature below about 950° C., and/or
   the electrolyte bath is passed through by an electric current having an intensity of greater than about 200 kA.

Various exemplary embodiments described herein also relate to a process for the purification and, in particular, electrolytic refining of aluminum by passing an electric current into an electrolyte bath by means of a cell according to the various exemplary embodiments described herein.

One example of a "three layer" purification process, which may use a cell according to the various exemplary embodiments described herein, is the process developed by R. Gadeau described in the publication "*The development of 85 kA three layer electrolysis cell for refining of aluminium*", Light Metals TMS, The Mineral, Metals and Material Society, 2008. U.S. Pat. Nos. 4,552,637, 3,386,908 and FR 759,588 describe other examples of aluminum purification processes in which a cell according to the various exemplary embodiments described herein may be used.

A cell contemplated by various exemplary embodiments described herein is particularly suitable for being used in a purification process in the sense that the cell has a wall comprising a block made of an aluminous material that advantageously has:
   a very good resistance to corrosion by the electrolyte bath, the particular composition of which facilitates the purification of the aluminum,
   a reduction in the risk of contamination of the purified aluminum, especially since the content of oxides that are more reducible than the aluminum of the constituent aluminous material of the side wall block is very low, preferably less than about 2%, or less than about 1%, or less than about 0.5% or even less than about 0.2%, as a weight percentage, and
   a particularly high electrical resistivity, especially if the beta-alumina content of said aluminous material is less than about 20% as a weight percentage.

Definitions

The "size" of the particles of a set of particles is conventionally given by a characterization of particle size distribution, for example by means of a laser particle size analyzer. The "median size" of a set of particles is referred to as the $D_{50}$ percentile, that is to say the size that divides the particles into first and second populations that are equal in weight, these first and second populations comprising only particles having a size greater than or equal to, or less than respectively, the median size.

The open porosity is measured according to the ISO 5017 standard.

The weight contents of oxides, in particular $Al_2O_3$, $Na_2O$, MgO, CaO, $SiO_2$, $ZrO_2$, may be measured by conventional chemistry techniques, such as by x-ray fluorescence.

The "reducibility" at 1000° C. of an oxide with respect to that of the alumina may be evaluated by means of well-known Ellingham-Richardson diagrams, such as for example described in "Pocket Manual Refractory Materials" by G. Routschka, Vulkan-Verlag Essen 1997 edition, pages 326-327.

The contents of oxides relate to the overall contents for each of the corresponding chemical elements, expressed in the form of the most stable oxide, according to the customary convention of the industry.

For the sake of clarity, the terms "$Al_2O_3$", "MgO" and "$SiO_2$" are used to denote the contents of these oxides in the composition, and "alpha-alumina" or "beta-alumina", "free magnesia" and "free silica" to denote crystalline phases of these oxides consisting of $Al_2O_3$, MgO and $SiO_2$ respectively.

These oxides may however also be present in other phases, in particular in the form of spinel or hibonite.

The expression "cryolite bath" is understood to mean a bath predominately based on fluoride salts defined in the system $NaF—AlF_3$. According to an exemplary embodiment, the cryolite bath comprises, as a weight percentage on the basis of the total weight of the bath, at least 50% of fluoride salts defined in said system. According to another exemplary embodiment, a cryolite bath comprises a content of chloride salts of less than 10%, preferably less than 5%, or less than 1%, expressed as an elemental Cl weight percentage, on the basis of the total weight of the bath. Cryolite $Na_3AlF_6$ is one of the compounds defined in this system. As is indicated in the work "Sels fondus à haute température" [High temperature molten salts] by Véronique Ghetta, Jacques Fouletier and Pierre Taxil, published by Presses polytechniques et universitaires romandes, chapter 8, additives such as in particular LiF, $CaF_2$, or KF may be added in order to reduce the temperature of the bath.

The expression "potassium bath" is understood to mean a bath predominately based on fluoride salts defined in the system $KF\text{-}AlF_3$. According to an exemplary embodiment, the potassium bath comprises, as a weight percentage on the basis of the total weight of the bath, at least 50% of fluoride salts defined in said system. According to another exemplary embodiment, a potassium bath comprises a content of chloride salts of less than 10%, preferably less than 5%, or less than 1%, expressed as an elemental Cl weight percentage, on the basis of the total weight of the bath. Such baths are for example described by V. Danielik in the article "Phase equilibria in the system $KF—AlF_3—Al_2O_3$", Chempap. 59(2) 81-84 (2005). As is specified in the work "Sels fondus a haute température" [High temperature molten salts] cited previously, the main advantage of potassium baths is that they make it possible to obtain low melting point mixtures that have, at equivalent temperature, an alumina solubility that is greater than that of "cryolitic" baths.

The weight contents of the crystalline oxide phases, in particular of the crystalline phases of beta-alumina, alpha-alumina, free magnesia, free silica, spinel, hibonite or of other calcium aluminates in crystalline form, may be measured, for example, by x-ray diffraction.

The content of CaO in non-crystalline form may be determined, for example, by the difference between the total content of Ca expressed in the form of CaO and the content of Ca present in the crystalline phases, expressed in the form of CaO.

All the percentages of the present description are weight percentages relative to the total weight of the aluminous material, unless otherwise indicated.

The expressions "containing a", "comprising a" or "having a" are understood to mean "having at least one", unless otherwise indicated.

BRIEF DESCRIPTION OF THE FIGURE

Other features and advantages of the various exemplary embodiments described herein will become more clearly apparent on reading the description which follows and on examining the appended drawing in which FIG. 1 schematically represents an electrolytic cell in cross section through a substantially median plane.

DETAILED DESCRIPTION

Process

The side block may be sintered or fused.

The processes for manufacturing fused blocks may comprise the following successive steps:
a) preparation of a feedstock,
b) melting of said feedstock until a molten material is obtained,
c) casting and solidification of said molten material, by cooling, so as to obtain a fused block.

In step a), the composition of the feedstock is adapted so that the fused block may be a block according to the various exemplary embodiments described herein.

A specified content for oxides, in particular alumina, magnesia or lime, or precursors of these oxides, or combinations of these oxides may be prepared systematically and methodically. For example, it is possible to add cement (aluminate of lime). The elements Mg, Ca and Al may be provided in carbonate or hydroxide, or borate or boride, or fluoride form for additions in a smaller amount. It is also possible to add magnesium spinel (MgAl$_2$O$_4$) or hibonite directly to the mixture.

In step b), the melting may be carried out by virtue of the combined action of quite a long electric arc, that does not give rise to reduction, with stirring, which promotes reoxidation. Short or medium arc adjustment can also be used.

In order to minimize the formation of cracks or crazing in the final block, melting may be carried out under oxidizing conditions, according to an exemplary embodiment. For example, the long-arc melting processes described in French patent no. 1208577 and its additions no. 75893 and no. 82310 may be used.

This process may include using an electric arc furnace in which the arc is struck between the feedstock and at least one electrode away from this feedstock and adjusting the arc length so that its reducing action is minimized, while maintaining an oxidizing atmosphere, according to an exemplary embodiment.

According to an exemplary embodiment, in casting step c), the temperature is above about 1900° C., or more preferably above about 2000° C.

In step c), several routes are possible:
casting into a mold wedged or placed a posteriori in a box containing a granular insulator. The process is referred to as a "transferless" process. The cooling is then passive;
casting into a mold which is opened very rapidly in order to extract the part. The process is referred to as a "transfer" process. The part is introduced, either into a box containing an insulator thus resulting in passive cooling, or into an annealing furnace. In the latter technology, the cooling is controlled, preferably so as to be carried out at a rate of less than about 20° C./hour, or more preferably at the rate of around about 10° C./hour.

Fused blocks have the advantage of being recyclable. In particular, worn-out fused blocks, after optional milling and classification, may be introduced into the feedstock in step a) of a process, according to the various exemplary embodiments described herein.

The processes for manufacturing sintered blocks may comprise the following successive steps:
a') preparation of a feedstock,
b') shaping of said feedstock in a mold,
c') compaction of said feedstock inside the mold so as to form a preform, so as to obtain a density of greater than about 50%, preferably greater than about 60%, and less than about 80% of the theoretical density of the mineral mixture constituting the preform,
d') removal of said perform from the mold,
e') drying of said preform, preferably in air or a humidity-controlled atmosphere,
f') firing of said preform in an atmosphere, such as any oxidizing atmosphere, such as air, at a temperature between about 1200° C. and about 1800° C., or more preferably between about 1300° C. and about 1650° C., or between about 1500° C. and about 1650° C., so as to obtain a sintered block.

According to an exemplary embodiment, the composition of the feedstock is adapted so that the sintered block may be a block according to the various exemplary embodiments described herein.

In step a'), a particulate mixture is conventionally mixed with a binder.

According to an exemplary embodiment, the particulate mixture has a particle size distribution by weight that has two main peaks centered about a size of less than about 50 μm and a size between about 50 microns and about 5 mm, or more preferably about 50 microns and about 1 mm, more preferably between about 50 microns and about 500 microns, respectively. According to an exemplary embodiment, the first peak is higher than the second.

Advantageously, the particle size distribution makes it possible to confer an optimal cohesion on the block manufactured and to promote the sintering and optimize the properties of the block.

According to an exemplary embodiment, the particulate mixture has a median particle size of less than about 50 microns.

The role of the binder is to form, with the particulate mixture, a mass that is sufficiently rigid to retain its shape until the sintering of step f'). The choice of the binder is dependent on the desired shape. Owing to the binder, the mass may advantageously take the form of a layer of variable thickness, suitable for following the wall of the mold, in order to form blocks.

Any known binder or mixture of known binders may be used. The binders are preferably "temporary", that is to say that they are completely or partly eliminated during the steps of drying and firing the block. More preferably, at least one of the temporary binders is a solution of modified starch derivatives, an aqueous solution of dextrin or of lignin derivatives, a solution of a synthetic agent such as polyvinyl alcohol, a phenolic resin or another resin of epoxy type, a furfuryl alcohol, or a mixture thereof. According to an exemplary embodiment, the amount of temporary binder is between about 0.5 and about 7% by weight relative to the weight of the particulate mixture of the feedstock.

Pressing additives conventionally used for the manufacture of sintered blocks may be added to the particulate mixture and to the binder, according to an exemplary embodiment. These additives comprise plasticizers, for example celluloses, modified starches or polyethylene glycols and lubricants, for example soluble oils or derivatives of stearates. The amounts of these additives may be those conventionally used during the manufacture of refractory blocks.

The mixing of the feedstock is continued until a substantially homogeneous mass is obtained.

In step b'), the feedstock is shaped and placed in a mold.

In the following compaction or "pressing" step c'), the content of the mold is subjected to a compression by application of a force to the feedstock capable of converting it into a preform capable of being sintered. A pressure between about 500 and about 5000 bar, preferably between about 1000 and about 3000 bar, is suitable. The pressing may be carried out isostatically, for example by means of a hydraulic press, according to an exemplary embodiment. It may advantageously be preceded by a manual or pneumatic ramming and/or vibration operation. The compaction advantageously makes it possible to reduce the open porosity.

The preform is then removed from the mold (step d')), and then dried (step e')). The drying may be carried out at a moderately high temperature. Preferably, it is carried out at a temperature between about 110 and about 200° C. It conventionally lasts between about 10 hours and about one week depending on the format of the preform, until the residual humidity of the preform is less than about 0.5%.

The dry preform is then fired (step f')). The duration of the firing, between about 3 and about 15 days approximately from cold to cold, varies as a function of the materials but also of the size and shape of the block. The firing cycle is preferably carried out in air, preferably at a temperature between about 1400° C. and about 2000° C., or more preferably between about 1500° C. and about 1800° C. A high sintering temperature advantageously makes it possible to reduce the open porosity.

Block

A block may have any dimensions and shape. According to an exemplary embodiment, a block is parallelepipedal. In one section plane, its shape may be a trapezoid, according to an exemplary embodiment.

According to an exemplary embodiment, a block may have concave or convex faces, such as, for example, a conical, cylindrical or corner-shaped surface.

The minimum thickness, such as the mean thickness of a block, may be greater than about 40 mm, greater than about 60 mm, or greater than about 70 mm or even greater than about 100 mm, according to an exemplary embodiment. A block according to the various exemplary embodiments described herein may indeed advantageously serve as the thermal insulation of the electrolytic cell.

According to an exemplary embodiment, the total porosity of the whole of a block is, for example, preferably less than about 40%. According to another exemplary embodiment, the total porosity of the entire block is, for example, preferably less than about 20%. According to another exemplary embodiment, the total porosity of the entire block is, for example, less than about 10%. According to another exemplary embodiment, the total porosity of the entire block is, for example, less than about 5%. According to another exemplary embodiment, the total porosity of the entire block is, for example, less than about 1%.

A person skilled in the art would be familiar with defining the parameters of the above processes in order to achieve such a total porosity.

According to an exemplary embodiment, the aluminous material represents less than about 20% of the weight of a block. The aluminous material may be a surface layer of a block, according to an exemplary embodiment, it being possible for said layer to define all or part of the outer surface of the block. According to an exemplary embodiment, the surface layer made of aluminous material defines at least the portion of the outer surface of the block intended to come into contact with the electrolyte bath.

The minimum thickness, or the mean thickness of the surface layer made of aluminous material may be greater than about 1 mm, greater than about 10 mm, or greater than about 25 mm.

According to an exemplary embodiment, the aluminous material may also represent, for example, more than about 25% of the weight of the block. In another exemplary embodiment, the aluminous material may represent, for example, more than about 50% of the weight of the block. In another exemplary embodiment, the aluminous material may represent, for example, more than about 75% of the weight of the block. In another exemplary embodiment, the aluminous material may represent, for example, more than about 90% of the weight of the block. In another exemplary embodiment, the aluminous material may represent, for example, substantially 100% of the weight of a block.

According to an exemplary embodiment, the open porosity of the aluminous material is less than about 10%, or more preferably less than about 7%, or more preferably less than about 5%. Those skilled in the art would be familiar with defining the parameters of the above processes in order to achieve such an open porosity.

In the case of the manufacture of a sintered block, the particle size curve of the particulate mixture of the feedstock or the sintering cycle may be modified, for example. The sintering time/temperature curve may also be modified.

According to an exemplary embodiment, Andréasen or Fuller-Bolomey compaction models may be used to modify the apparent density of the sintered products. Such compaction models are described in the work entitled "Traité de céramiques et matériaux minéraux" [Treatise on ceramics and mineral materials], C. A. Jouenne, Editions Septima, Paris (1984), pages 403 to 405.

For the manufacture of a fused block, agents that form an intermediate compound with a low melting point, such as, for example, fluorides or carbides or oxides of alkali metals, may be added to the feedstock. An annealing time/temperature curve may also be controlled.

According to an exemplary embodiment, the oxides represent more than about 98%, more than about 99%, or substantially 100% of the weight of the aluminous material.

According to an exemplary embodiment, $Al_2O_3$>75%, or $Al_2O_3$>85%, or $Al_2O_3$>92% or even $Al_2O_3$>98%, as a weight percentage on the basis of the aluminous material.

The use of an alumina-based block advantageously limits the contamination of the electrolyte bath during the wearing down of the block.

According to an exemplary embodiment, the aluminous material comprises more than about 50%, or more than about 75% of alpha-alumina or corundum, as a weight percentage on the basis of the aluminous material.

According to an exemplary embodiment, the content of beta-alumina is less than about 53%, less than about 50%, less than about 25%, or less than about 20%, less than about 15%, or less than about 10% or less than about 5%, as a weight percentage on the basis of the aluminous material. The inventors have indeed observed that a low content of beta-alumina makes it possible to obtain a block having a high corrosion resistance and a high electrical resistivity. Moreover, a low content of beta-alumina facilitates the recycling of the worn blocks.

According to an exemplary embodiment, more than about 80%, or more preferably more than about 90%, or more than about 95% by weight of the aluminum is present in one of the following forms: alpha-alumina and beta-alumina.

According to an exemplary embodiment, more than about 80%, preferably more than about 90%, or more than about 95% by weight of the aluminum is present in one of the following forms: alpha-alumina, beta-alumina, hibonite and spinel.

The process for manufacturing the block is preferably adapted to avoid the development of a high beta-alumina phase, such as to avoid a beta-alumina content of greater than 20%. According to an exemplary embodiment, raw materials may have a low content of $Na_2O$ available for the formation of beta-alumina during the manufacture of the block. A reaction between the alumina and $Na_2O$ may be reduced by controlling the content of silica $SiO_2$ so as to obtain a soda-silicate glassy phase, it being possible for such a reaction to result in the formation of beta-alumina below about 1300° C. According to an exemplary embodiment, the content of $SiO_2$ in the aluminous material should however be limited to less than about 2%, or to less than about 1.5%. Additives that promote the vaporisation of $Na_2O$ may be added. The product may be annealed after fusion or sintering, such as at a temperature above about 1500° C. in order to eliminate, at least partly, $Na_2O$ and promote the formation of alpha-alumina.

All these techniques for limiting the content of beta-alumina are contemplated by the various exemplary embodiments described herein.

The oxides that are less reducible than alumina at 1000° C. may represent more than about 0.1% and/or less than about 20%, less than about 10%, less than about 5%, less than about 3%, as a weight percentage on the basis of the aluminous material.

According to an exemplary embodiment, the content of oxides that are less reducible than alumina at about 1000° C. and other than CaO and MgO is less than about 5%, preferably less than about 2%, preferably less than about 1%.

According to an exemplary embodiment, the oxides that are less reducible than alumina at about 1000° C. consist, for more than about 90%, more than about 95%, or even substantially 100% of their weight, of CaO and/or MgO and/or $ZrO_2$.

Oxides that are less reducible than alumina at about 1000° C. consist, for more than about 90%, more than about 95%, or even substantially 100% of their weight, of CaO and/or MgO, according to an exemplary embodiment.

According to an exemplary embodiment, $Al_2O_3$+MgO+CaO>about 70%.

According to another exemplary embodiment, $Al_2O_3$+MgO+CaO>about 80%.

According to another exemplary embodiment, $Al_2O_3$+MgO+CaO>about 90%.

According to another exemplary embodiment, $Al_2O_3$+MgO+CaO>about 95%.

According to another exemplary embodiment, $Al_2O_3$+MgO+CaO>about 97%.

According to an exemplary embodiment, MgO<about 40%. According to another exemplary embodiment, MgO<about 38%.

In one embodiment, MgO>about 28%, or more preferably MgO>about 32%.

MgO may be in the form of magnesia, not in spinel form, such as in crystalline periclase form or in non-crystalline form, according to an exemplary embodiment. According to an exemplary embodiment, the content of non-crystalline magnesia in spinel form is less than about 25%, or more preferably less than about 16%. The possible contamination of the electrolyte bath is advantageously reduced thereby.

According to an exemplary embodiment, more than about 80%, preferably more than about 90%, or more than about 95% by weight of the magnesium is present in one of the following forms: periclase, non-crystalline magnesia and spinel.

According to an exemplary embodiment, CaO<about 15%, or more preferably CaO<about 10%, preferably CaO<about 8%.

According to an exemplary embodiment, CaO>about 1%, or more preferably CaO>about 1.5%.

According to an exemplary embodiment, CaO is present, for more than about 90% of its weight, in the form of hibonite $CaO(Al_2O_3)_6$.

The content of non-crystalline lime in hibonite form, for example, in the form of other calcium aluminates, such as $CaO.2Al_2O_3$, or in non-crystalline form, is preferably less than about 25%, more preferably still less than about 16%, as a weight percentage on the basis of the aluminous material. The possible contamination of the electrolyte bath is advantageously reduced thereby.

Among the oxides that are more reducible than alumina at 1000° C., and therefore to be considered among the "other constituents", are also copper, tin, boron, phosphorus, chromium and zinc oxides. According to an exemplary embodiment, the total content of copper, tin, boron, phosphorus and zinc oxides is less than about 2%. According to an exemplary embodiment, the total content of copper, tin, boron, phosphorus, chromium and zinc oxides is less than about 2%. According to another exemplary embodiment, the phosphorus content is preferably less than about 1%, more preferably less than about 0.5% or even less than about 0.2%. According to an exemplary embodiment, the product does not comprise phosphate. For an application that uses a process for purifying aluminum by passing an electric current into the electrolyte bath, according to the various exemplary embodiments described herein, the total content of tin, boron, phosphorus, iron, titanium, chromium and zinc oxides is preferably less than about 2%, or less than about 1%, more preferably less than about 0.5% or even less than about 0.2%.

Conventionally, $Na_2O$ is an impurity of alumina sources. The inventors have discovered that limiting the content of $Na_2O$, such as by choosing very pure alumina sources, makes it possible to considerably improve the performances of the block.

According to an exemplary embodiment, $Na_2O$<about 3.5%, or more preferably $Na_2O$<about 3%, or more preferably $Na_2O$<about 2%, or more preferably $Na_2O$<about 1%, or more preferably $Na_2O$<about 0.5%, or more preferably $Na_2O$<about 0.3%, or more preferably $Na_2O$<about 0.1%. The alumina sources may be selected for this purpose.

In one embodiment, $Na_2O$>about 0.2%, or more preferably $Na_2O$>about 0.3%.

According to an exemplary embodiment, more than about 80%, or more preferably more than about 90%, or more than about 95% by weight of the sodium is present in one of the following forms: sodium silicate phase and beta-alumina.

According to an exemplary embodiment, the total content of "other constituents" is less than about 4.5%, less than about 4%, less than about 3%, less than about 2%, preferably less than about 1%.

According to an exemplary embodiment, $SiO_2$<about 1.5%, or more preferably $SiO_2$<about 1.0%, or more preferably $SiO_2$<about 0.5%. According to an exemplary embodiment, the content of free silica (that is to say silica that is not bonded in the form of another phase, for example in the form of mullite $3(Al_2O_3)2SiO_2$) is less than about 1%, preferably less than about 0.5%. The sensitivity of the aluminous material to the electrolyte bath is advantageously reduced thereby.

The thermal conductivity of the aluminous material at about 600° C. may be greater than about 3 W/m·K, and/or less than about 15 W/m·K, or more preferably less than about 10 W/m·K, or more preferably less than about 8 W/m·K. A low thermal conductivity advantageously renders the block well suited for improving the thermal insulation, and therefore the energy efficiency of the cell.

The electrical resistivity of the aluminous material at about 700° C. may be greater than about 1000 ohm·cm, or more preferably greater than about 2000 ohm·cm, or more preferably greater than about 2500 ohm·cm. A high electrical resistivity advantageously makes it possible to limit the current losses and to improve the electrical efficiency.

Cell

The side wall of the electrolytic cell comprises a plurality of assembled blocks. Each block forming the side wall of a cell are blocks configured according to the various exemplary embodiments described herein. According to an exemplary embodiment, the inner surface of the side wall, which defines the internal volume of the cell and is in contact with the electrolyte bath, is defined by side blocks configured according to the various exemplary embodiments described herein. The blocks are assembled with no cement joint between them, according to an exemplary embodiment. The blocks may comprise projections or recesses or rebates, or grooves and ridges, in order to improve sealing and reduce the risks of leakage of metal or of cryolite bath between the blocks thus arranged. The electrolytic cell contains an electrolyte bath.

According to one embodiment, the electrolyte bath is a cryolite bath or a potassium bath. It is not out of the question for the electrolyte bath to contain elpasolite ($K_2NaAlF_6$).

According to an exemplary embodiment, the aluminous material of the blocks is in contact with the electrolyte bath.

In one preferred embodiment, the cell does not comprise a self-lining layer. Advantageously, the cell may be thermally insulated and its energy efficiency thus improved.

In one embodiment, the electrolyte bath comprises, preferably for more than about 20% of its weight, a fluoride salt, or more preferably $AlF_3$ and/or an alkali metal fluoride, in particular NaF or KF.

According to an exemplary embodiment, the electrolyte bath comprises $AlF_3$ and at least one alkali metal fluoride NaF and/or KF such that the (NaF+KF)/$AlF_3$ molar ratio is less than about 3, or more preferably less than about 2, more preferably less than about 1.6. The bath may comprise other fluorides such as LiF; $MgF_2$; $CaF_2$. According to an exemplary embodiment, the bath has an $AlF_3$ molar content of greater than about 30%, or more preferably greater than about 35%, or more preferably greater than about 37%, and/or less than about 50%, or more preferably less than about 47%.

A high $AlF_3$ content advantageously makes it possible to acidify the electrolyte bath and permits electrolysis at reduced temperatures.

In one embodiment, the temperature of the electrolyte bath is below about 950° C., or more preferably below about 930° C., and/or above about 800° C.

In one embodiment, an electric current having an intensity greater than about 100 kA, or greater than about 200 kA passes through the electrolyte bath.

In one embodiment, the cell comprises an insulating material placed so as to limit heat losses through said side block.

According to an exemplary embodiment, insulating material is selected from the group formed by aluminous or silicoaluminous products having a thermal conductivity of less than about 3 W/m·K at 400° C., such as material in the form of shaped parts, of ramming material, of concrete, of cement or even of a ceramic foam.

The insulating material may be in the form of a layer having a thickness greater than about 1 cm, or greater than about 5 cm, or greater than about 10 cm, or even greater than about 15 cm, depending on the type of cell. This layer is preferably placed near to, preferably in contact with the side block, preferably in contact with the surface of the side block that is opposite the surface of the side block in contact with the electrolyte bath.

EXAMPLES

The following examples are provided for illustrative purposes and do not limit the various exemplary embodiments described herein.

Examples 1 to 4, 7* and 9* were melted in an arc furnace at 2000° C., as described above, then the molten material was cast in order to obtain blocks having dimensions of 400*400*200 $mm^3$. These blocks were annealed.

For examples 5, 6 and 8*, the raw materials were mixed in an Eirich-type mixer. The feedstock thus obtained was pressed isostatically in order to obtain preforms having dimensions of 300*100*100 $mm^3$, the relative dry density of which was greater than 95%. The sintering was carried out at 1500° C. in air. Table 1 below indicates the powders used as raw materials:

TABLE 1

| Example | Raw materials (weight %) |
|---|---|
| 1 | Calcined alumina ($D_{50}$ of around 70 microns) + sodium carbonate ($Na_2CO_3$) + lithium carbonate ($Li_2CO_3$) |
| 2 | Calcined alumina ($D_{50}$ of around 70 microns) + sodium silicate + lithium carbonate ($Li_2CO_3$) |
| 3 | Calcined alumina ($D_{50}$ of around 70 microns) + MgO + $Na_2CO_3$ + $AlF_3$ |
| 4 | 64% calcined alumina ($D_{50}$ of around 70 microns) + 35% premier SKLS magnesia MgO + 0.5% pure copper oxide CuO + 0.5% $AlF_3$ + 0.5% $B_4C$ |
| 5 | 59% calcined alumina ($Al_2O_3$ content greater than or equal to 99.5%, $D_{50}$ of around 0.5 µm), 39% hibonite $D_{50}$ <10 microns, 2% PEG 2000 |
| 6 | 99% calcined alumina ($Al_2O_3$ content greater than or equal to 99.5%, $D_{50}$ of around 0.5 µm) + 1% PVA |
| 7* | Calcined alumina ($D_{50}$ of around 70 µm) + $Na_2CO_3$ |
| 8* | 80% white corundum (particle sizes between 0.050 and 4 mm, $D_{50}$ of around 1.2 mm, purity > 99.5% of $Al_2O_3$); 15% calcined alumina ($Al_2O_3$ content greater than or equal to 99.5% and $D_{50}$ of around 4 µm), 4% calcined alumina ($Al_2O_3$ content greater than or equal to 99.5% and $D_{50}$ of around 0.5 µm) + 1% of starch derivative (pressing agent) |
| 9* | 40% of a powder of Jargal M grains, electrofused product provided by the company SEPR, remilled in unsorted form of less than 15 mm, and 60% of calcined alumina ($Al_2O_3$ content greater than or equal to 99.5% and $D_{50}$ of around 4 µm). |

Analysis of the phases was carried out by x-ray diffraction.

The open porosity was measured according to ISO 5017 on a test specimen with dimensions of 25*25*150 mm³ taken from the core of the block. The thermal conductivity and the electrical resistivity were measured respectively according to the EN 99314 and ASTM D257 2007 standards on test specimens cut from the core of the block.

The test specimens had a diameter of 50 mm and a thickness of 35 mm for the thermal conductivity test and a diameter of 30 mm and a thickness of 30 mm for the electrical resistivity test.

Tests of resistance to corrosion in the cryolite bath make it possible to evaluate the resistance of cylindrical-shaped samples having a diameter of 14 mm. These samples are immersed and rotated for 24 hours in a cryolite bath. A first test (test 1) is carried out at 1000° C. with a cryolite bath having an $AlF_3$ excess of 11% by weight (NaF/$AlF_3$ molar ratio=2.2), a $CaF_2$ content of 5% by weight and an alumina $Al_2O_3$ content of 8%. A second test (test 2) is carried out at 900° C. with a cryolite bath having an $AlF_3$ excess of 25% by weight, a $CaF_2$ content of 4% and an alumina $Al_2O_3$ content of 4%. In both cases, the test temperature is around 50° C. above the theoretical melting point of the bath and the alumina content is close to saturation. The differential measurement of the diameter of the samples before and after testing, relative to the diameter before testing, makes it possible to determine a corrosion index, in %. The lower this index is (in absolute value), the greater the resistance to cryolite.

TABLE 2

| Example | 1 | 2 | 3 | 4 | 5 | 6 | 7* | 8* | 9* |
|---|---|---|---|---|---|---|---|---|---|
| chemical composition (expressed in the form of elementary oxides) | | | | | | | | | |
| $Na_2O$ % | 0.60% | 0.40% | 0.30% | 0.05% | 0.05% | 900 ppm | 4.00% | <0.5% | 2.2% |
| $Al_2O_3$ % | 99.0% | 99.1% | 97.0% | 64.0% | 93.0% | 99.8% | 95.0% | 99.5% | 97.0% |
| $SiO_2$ % | 0.10% | 0.27% | 0.10% | 0.05% | 0.70% | 300 ppm | 0.50% | <0.5% | 0.5% |
| $ZrO_2$ % | <0.5% | <0.5% | <0.5% | <0.5% | <0.5% | <0.5% | <0.5% | <0.5% | <0.5% |
| MgO % | <0.1% | <0.1% | 2.50% | 35% | <0.1% | <0.1% | | <0.25% | <0.1% |
| CaO % | <0.1% | <0.1% | <0.1% | <0.9% | 6% | <0.1% | | <0.25% | <0.1% |
| Other constituents | | | | balance to 100% | | | | | |
| crystallographic composition determined by x-ray diffraction | | | | | | | | | |
| alpha-alumina | 87% | 91% | 85% | ND | >18% | >98% | 47% | >98% | >73% |
| beta-alumina | 12% | 8% | 6% | ND | <2% | <2% | 53% | <2% | 25% |
| Spinel | ND | ND | 8% | 90% | ND | ND | ND | ND | ND |
| Hibonite | ND | ND | ND | ND | 80% | ND | ND | ND | ND |
| MgO (periclase) | ND | ND | ND | 9-10% | ND | ND | ND | ND | ND |
| other physical characteristics | | | | | | | | | |
| open porosity | 2% | 3% | 7% | 3% | 5% | 0.10% | 2% | 15% | 4.5% |
| thermal conductivity at 600° C. (W/m · K) | 7.5 | 7 | 6 | 4.5 | NM | NM | 4.5 | 3 | NM |
| electrical resistivity at 700° C. (Ohm · cm) | 2600 | 3000 | 3000 | 2700 | 3100 | 2800 | 100 | NM | 380 |

TABLE 2-continued

| Example | 1 | 2 | 3 | 4 | 5 | 6 | 7* | 8* | 9* |
|---|---|---|---|---|---|---|---|---|---|
| technical effect | | | | | | | | | |
| Test 1 corrosion index | −26% | −30% | NM | NM | −18% | −14% | −50% | −40% | NM |
| Test 2 corrosion index | −2% | −3% | −4% | −6% | NM | −7% | −13% | NM | NM |

*comparative example
ND: not detectable;
NM: not determined

The results of the corrosion tests show that the materials contemplated by the various exemplary embodiments described herein have a corrosion resistance that is greatly improved relative to the comparative examples.

Furthermore, the materials according to the various exemplary embodiments described herein have a resistivity at temperature that is significantly higher than the comparative examples, which is highly favorable for the application as a side block of an electrolytic cell.

Other tests have furthermore shown that a block according to the various exemplary embodiments described herein has a high abrasion resistance, which is particularly useful when the electrical intensities are greater than about 200 kA, or greater than about 300 kA.

As is now clearly apparent, the various exemplary embodiments described herein provide a refractory block that is well suited to acting as a side block of an electrolytic cell.

In particular, this block has good performances in terms of:
resistance to oxidation and to corrosion by the electrolyte bath and its vapors,
abrasion resistance, which is particularly useful when the electrical intensities are greater than about 200 kA, or greater than about 300 kA,
thermal conductivity,
contamination of the electrolyte bath,
electrical resistivity.

These performances advantageously make it possible to limit the energy consumption during the production of aluminum by electrolysis, while retaining a long service life.

Of course, the various exemplary embodiments described herein are not limited to the embodiments described, which are provided by way of illustrative and nonlimiting examples.

The invention claimed is:

1. An electrolytic cell for the production of aluminum by reduction of alumina, said cell containing an electrolyte bath and having a side wall that comprises at least one side block, said side block comprising an aluminous material having
an open porosity of less than 10%, and
a composition, as a weight percentage on the basis of the aluminous material and for a total of 100%, such that:
$Al_2O_3$ >50%, beta-alumina representing less than 20% of the weight of the aluminous material,
oxides that are less reducible than alumina at 1000° C.: <46%,
$Na_2O$ <3.9%,
other constituents <2%,
said composition of the aluminous material being such that: $Al_2O_3+MgO+CaO$ >95%.

2. The cell as claimed in claim 1, the electrolyte bath comprising $AlF_3$ and at least one alkali metal fluoride NaF or KF at an $(NaF+KF)/AlF_3$ molar ratio of less than 3.

3. The cell as claimed in claim 1, the electrolyte bath comprising a molar content of $AlF_3$ of greater than 30%.

4. The cell as claimed in claim 1, the electrolyte bath comprising a molar content of $AlF_3$ of greater than 37%.

5. The cell as claimed in claim 1, said side block having a minimum thickness of greater than 40 mm.

6. The cell as claimed in claim 1, said side block having a total porosity of less than 5%.

7. The cell as claimed in claim 1, a content of oxides that are less reducible than alumina at 1000° C. being less than 10%.

8. The cell as claimed in claim 1, a content of oxides that are less reducible than alumina at 1000° C. being less than 5%.

9. The cell as claimed in claim 1, said composition of the aluminous material being such that: $SiO_2$<1.5%.

10. The cell as claimed in claim 1, the aluminous material comprising at least a corundum and/or magnesium spinel crystalline phase and/or a hibonite ($CaO.6Al_2O_3$) phase.

11. The cell as claimed in claim 1, said composition of the aluminous material being such that: $Al_2O_3$ >92%.

12. The cell as claimed in claim 1, the composition of the aluminous material being such that: $Na_2O$ <3%.

13. The cell as claimed in claim 1, said composition of the aluminous material being such that: $Na_2O$ <1%.

14. The cell as claimed in claim 13, said composition of the aluminous material being such that: $Na_2O$ <0.1%.

15. The cell as claimed in claim 1, a thermal conductivity of the aluminous material at 600° C. being less than 10 W/m·K.

16. The cell as claimed in claim 1, an electrical resistivity of the aluminous material at 700° C. being greater than 2000 ohm·cm.

17. The cell as claimed in claim 1, the electrolyte bath being a cryolite bath or a potassium bath.

18. The cell as claimed in claim 1, a temperature of the electrolyte bath being below 950° C. and/or above 800° C.

19. The cell as claimed in claim 1, a total content of other constituents being less than 4.5%.

20. The cell as claimed in claim 1, said side block being obtained by a fusion process or by a sintering process comprising a compaction step and/or comprising a sintering step at a temperature above or equal to 1300° C.

21. The cell as claimed in claim 1, said side block being in contact with the electrolyte bath.

22. The cell as claimed in claim 1, comprising an insulating material placed so as to limit heat losses through said side block.

23. A process for producing aluminum by passing an electric current into the electrolyte bath of a cell as claimed in claim 1.

24. The process as claimed in claim 23, wherein, under steady-state operation, the aluminous material is in contact with the electrolyte bath.

25. The process as claimed in claim 23, wherein, under steady-state operation, the electrolyte bath is at a temperature below 950° C.

26. The process as claimed in claim 23, wherein the electrolyte bath is passed through by an electric current having an intensity of greater than 100 kA.

27. A process for purifying aluminum by passing an electric current into an electrolyte bath by means of a cell as claimed in claim 1.

28. An electrolytic cell for the production of aluminum by reduction of alumina, said cell containing an electrolyte bath and having a side wall that comprises at least one side block, said side block comprising an aluminous material having
an open porosity of less than 10%, and
a composition, as a weight percentage on the basis of the aluminous material and for a total of 100%, such that:
$Al_2O_3$ >50%, beta alumina representing less than 20% of the weight of the aluminous material,
oxides that are less reducible than alumina at 1000° C.: <46%,
$Na_2O$ <3.9%,
other constituents <5%,
wherein MgO >28%.

29. The cell as claimed in claim 28, said side block having a total porosity of less than 5%.

30. The cell as claimed in claim 28, a content of oxides that are less reducible than alumina at 1000° C. being less than 10%.

31. The cell as claimed in claim 28, a content of oxides that are less reducible than alumina at 1000° C. being less than 5%.

32. The cell as claimed in claim 28, said composition of the aluminous material being such that: $SiO_2$<1.5%.

33. The cell as claimed in claim 28, the aluminous material comprising at least a corundum and/or magnesium spinel crystalline phase and/or a hibonite ($CaO.6Al_2O_3$) phase.

34. The cell as claimed in claim 28, the composition of the aluminous material being such that: $Na_2O$ <3%.

35. The cell as claimed in claim 28, said composition of the aluminous material being such that: $Na_2O$ <1%.

36. The cell as claimed in claim 28, said composition of the aluminous material being such that: $Na_2O$ <0.1%.

37. An electrolytic cell for the production of aluminum by reduction of alumina, said cell containing an electrolyte bath and having a side wall that comprises at least one side block, said side block comprising an aluminous material having
an open porosity of less than 10%, and
a composition, as a weight percentage on the basis of the aluminous material and for a total of 100%, such that:
$Al_2O_3$ >50%, beta alumina representing less than 20% of the weight of the aluminous material,
oxides that are less reducible than alumina at 1000° C.: <46%,
$Na_2O$ <3.9%,
other constituents <5%,
wherein CaO >1%.

38. The cell as claimed in claim 37, said side block having a total porosity of less than 5%.

39. The cell as claimed in claim 37, a content of oxides that are less reducible than alumina at 1000° C. being less than 10%.

40. The cell as claimed in claim 37, a content of oxides that are less reducible than alumina at 1000° C. being less than 5%.

41. The cell as claimed in claim 37, said composition of the aluminous material being such that: $SiO_2$<1.5%.

42. The cell as claimed in claim 37, the aluminous material comprising at least a corundum and/or magnesium spinel crystalline phase and/or a hibonite ($CaO.6Al_2O_3$) phase.

43. The cell as claimed in claim 37, the composition of the aluminous material being such that: $Na_2O$ <3%.

44. The cell as claimed in claim 37, said composition of the aluminous material being such that: $Na_2O$ <1%.

45. The cell as claimed in claim 37, said composition of the aluminous material being such that: $Na_2O$ <0.1%.

46. The cell as claimed in claim 1, the composition of the aluminous material being such that $Al_2O_3$>85%.

47. An electrolytic cell for the production of aluminum by reduction of alumina, said cell containing an electrolyte bath and having a side wall that comprises at least one side block, said side block comprising an aluminous material having
an open porosity of less than 10%, and
a composition, as a weight percentage on the basis of the aluminous material and for a total of 100%, such that:
$Al_2O_3$>50%, beta-alumina representing less than 20% of the weight of the aluminous material,
oxides that are less reducible than alumina at 1000° C.: <46%,
$Na_2O$ <3.9%,
other constituents <1%,
said composition of the aluminous material being such that: $Al_2O_3$+MgO +CaO >95%.

48. An electrolytic cell for the production of aluminum by reduction of alumina, said cell containing an electrolyte bath and having a side wall that comprises at least one side block, said side block comprising an aluminous material having
an open porosity of less than 10%, and
a composition, as a weight percentage on the basis of the aluminous material and for a total of 100%, such that:
$Al_2O_3$ >50%, beta-alumina representing less than 20% of the weight of the aluminous material,
oxides that are less reducible than alumina at 1000° C.: <46%,
$Na_2O$ <3.9%,
other constituents <5%,
said composition of the aluminous material being such that: $Al_2O_3$+MgO+CaO>95%,
wherein the total content of copper, tin, boron, phosphorus, chromium and zinc oxides is less than 2%.

49. The electrolytic cell according to claim 48, wherein the total content of tin, boron, phosphorus, iron, titanium, chromium and zinc oxides is less than 2%.

50. The electrolytic cell according to claim 48, wherein the total content of tin, boron, phosphorus, iron, titanium, chromium and zinc oxides is less than 1%.

51. An electrolytic cell for the production of aluminum by reduction of alumina, said cell containing an electrolyte bath and having a side wall that comprises at least one fused side block, said side block comprising an aluminous material having
an open porosity of less than 10%, and
a composition, as a weight percentage on the basis of the aluminous material and for a total of 100%, such that:
$Al_2O_3$>50%, beta-alumina representing less than 20% of the weight of the aluminous material, oxides that are less reducible than alumina at 1000° C.: <46%,
Na$_2$O <3.9%,
other constituents <5%,
said composition of the aluminous material being such that:
Al$_2$O$_3$+MgO +CaO >95%.

\* \* \* \* \*

UNITED STATES PATENT AND TRADEMARK OFFICE
CERTIFICATE OF CORRECTION

PATENT NO. : 9,932,681 B2
APPLICATION NO. : 14/373170
DATED : April 3, 2018
INVENTOR(S) : Eric Jorge, Olivier Francy and Olivier Panagiotis It is certified that error appears in the above-identified patent and that said Letters Patent is hereby corrected as shown below:

On the Title Page

Item (71): "Saint-Gobain Centre De Recherches Et D'Etudes European" should be
-- Saint-Gobain Centre De Recherches Et D'Etudes Europeen --

Signed and Sealed this
Thirty-first Day of July, 2018

Andrei Iancu
*Director of the United States Patent and Trademark Office*